(12) United States Patent
Su et al.

(10) Patent No.: US 12,266,954 B2
(45) Date of Patent: Apr. 1, 2025

(54) POWER-SUPPLYING AND DRIVING CIRCUIT OF ACTIVE EQUALIZATION MATRIX SWITCH OF BATTERY MANAGEMENT SYSTEM OF VEHICLE

(71) Applicant: Shenzhen Klclear Technology Co., LTD, Guangdong (CN)

(72) Inventors: Liangqin Su, Guangdong (CN); Yunping Hu, Guangdong (CN); Baodong Zhang, Guangdong (CN); Yangyuan Zhang, Guangdong (CN)

(73) Assignee: Shenzhen Klclear Technology Co., LTD, Guangdong (CN)

( * ) Notice: Subject to any disclaimer, the term of this patent is extended or adjusted under 35 U.S.C. 154(b) by 794 days.

(21) Appl. No.: 17/537,449

(22) Filed: Nov. 29, 2021

(65) Prior Publication Data
US 2022/0085625 A1 Mar. 17, 2022

Related U.S. Application Data

(63) Continuation of application No. PCT/CN2020/084859, filed on Apr. 15, 2020.

(30) Foreign Application Priority Data

Sep. 18, 2019 (CN) .......................... 201910883016.4

(51) Int. Cl.
*H02J 7/00* (2006.01)
*B60L 58/22* (2019.01)
(Continued)

(52) U.S. Cl.
CPC ............ *H02J 7/0019* (2013.01); *B60L 58/22* (2019.02); *H02M 3/077* (2021.05)

(58) Field of Classification Search
CPC ........ H02J 7/0019; B60L 58/00; B60L 58/10; B60L 58/18; B60L 58/19; B60L 58/22; H02M 3/077
(Continued)

(56) References Cited

U.S. PATENT DOCUMENTS

| | | | |
|---|---|---|---|
| 10,554,057 B1 * | 2/2020 | Wang | ................... H02J 7/1423 |
| 2001/0043113 A1 | 11/2001 | Hoshino | |

(Continued)

FOREIGN PATENT DOCUMENTS

| | | |
|---|---|---|
| CN | 101141012 | 3/2008 |
| CN | 105763039 | 7/2016 |

(Continued)

*Primary Examiner* — Alexis B Pacheco
(74) *Attorney, Agent, or Firm* — Winston Hsu

(57) ABSTRACT

Disclosed is a power-supplying and driving circuit of an active equalization matrix switch of a battery management system of a vehicle. The power-supplying and driving circuit includes a boost circuit, a constant current source circuit and a driver. The boost circuit includes a first input end and a first output end; the constant current source circuit includes a constant current driving signal output end; the first input end is connected to the positive pole of a battery pack of a matrix switch circuit; the first output end is connected to the constant current source circuit to provide high potential for the constant current source circuit to drive the matrix switch circuit; the constant current driving signal output end is connected to the matrix switch circuit to drive the matrix switch circuit; and the driver is used for controlling the constant current source circuit to output a constant current driving signal.

10 Claims, 2 Drawing Sheets

(51) Int. Cl.
*H02J 7/14* (2006.01)
*H02M 3/07* (2006.01)

(58) Field of Classification Search
USPC .......................................... 320/134
See application file for complete search history.

(56) References Cited

U.S. PATENT DOCUMENTS

| | | | | |
|---|---|---|---|---|
| 2009/0198399 | A1* | 8/2009 | Kubo | H02J 7/00309 |
| | | | | 701/22 |
| 2010/0097031 | A1* | 4/2010 | King | B60L 53/14 |
| | | | | 320/109 |
| 2010/0141213 | A1* | 6/2010 | Iida | B60L 50/61 |
| | | | | 320/134 |
| 2010/0231167 | A1* | 9/2010 | Ohnuki | H02J 7/0018 |
| | | | | 320/109 |
| 2012/0126755 | A1* | 5/2012 | Perisic | B60L 55/00 |
| | | | | 320/145 |
| 2014/0184172 | A1* | 7/2014 | Momo | B60L 53/12 |
| | | | | 320/160 |
| 2014/0292259 | A1* | 10/2014 | Kim | H02J 7/00 |
| | | | | 320/107 |
| 2015/0191091 | A1* | 7/2015 | Kvieska | H02J 7/02 |
| | | | | 320/109 |
| 2015/0380948 | A1* | 12/2015 | Mazaki | H02J 50/90 |
| | | | | 307/104 |
| 2017/0279287 | A1* | 9/2017 | Solodovnik | H02M 7/06 |
| 2018/0062430 | A1* | 3/2018 | Matsumoto | H02J 7/00 |
| 2020/0091830 | A1* | 3/2020 | Maruyama | H02J 7/0024 |
| 2021/0066928 | A1* | 3/2021 | Maji | H02J 7/0013 |
| 2021/0313870 | A1* | 10/2021 | Iwabuki | H02M 1/007 |

FOREIGN PATENT DOCUMENTS

| | | |
|---|---|---|
| CN | 106463955 | 2/2017 |
| CN | 107800290 | 3/2018 |
| CN | 110588438 | 12/2019 |
| CN | 210792873 | 6/2020 |

* cited by examiner

POWER-SUPPLYING AND DRIVING CIRCUIT OF ACTIVE EQUALIZATION MATRIX SWITCH OF BATTERY MANAGEMENT SYSTEM OF VEHICLE

CROSS REFERENCE TO RELATED APPLICATIONS

The present application is a Continuation Application of PCT Application No. PCT/CN2020/084859 filed on Apr. 15, 2020, which claims the priority of Chinese Patent Application No. 201910883016.4 filed on Sep. 18, 2019. The contents of all of the above are hereby incorporated by reference.

BACKGROUND OF THE INVENTION

1. Field of the Invention

The present application relates to the technical field of battery management, in particular to a power-supplying and driving circuit of an active equalization matrix switch of a battery management system of a vehicle.

2. Description of the Related Art

With the rapid development of an electric vehicle, the electric vehicle has higher and higher requirements on the service life and cruising mileage of a battery. There will be a difference in voltages of single batteries of a battery pack during work due to the problem of production consistency of lithium batteries. In order to prolong the service life of the battery and ensure the safety of the battery, the voltages of the single batteries of the battery pack are required to be detected, and the single batteries which are inconsistent are enabled to perform equalization charge or discharge, so that voltage values of all the single batteries are kept consistent. Passive equalization belongs to an energy consumption technology and has limitations such as low equalization ability and few functions, and therefore, an active equalization technology is introduced. The active equalization technology belongs to an energy transfer technology and has the advantages such as high efficiency and high equalization ability. However, the technology also brings new problems such as greater EMI (Electromagnetic Interference), complicated overall structure, and particular driving control on matrix switches.

The current control method for an active equalization switch matrix is achieved by adopting an auxiliary power source and an optical isolation device. The auxiliary power source supplies power to secondary sides of isolation optocouplers and supplies driving voltages to MOS tubes in the matrix switches; each isolation optocoupler controls a pair of gated MOS tubes, and N+1 isolation optocouplers are required (N is the number of the batteries). When a certain single battery is required to be equalized, the matrix switches on the positive and negative poles of the battery are required to be turned on, so that the battery enters a common circuit, and energy conversion is achieved by a reversing switch and main transformation topology. For the control on the matrix switches on the positive and negative poles of the battery, light emitting diodes of the isolation optocouplers are required to be controlled to be turned on primary sides, and then, transistors on the secondary sides of the isolation optocouplers are turned on, so that the auxiliary power source directly drives the MOS of the matrix switches. In a plurality of strings of batteries, the matrix switches of the positive and negative poles of only one battery are turned on alone. A circuit adopting the control manner is complicated in structure, thereby causing higher cost. Moreover, the introduction of the auxiliary power source may cause a greater EMC (Electromagnetic Compatibility) problem.

The disclosure of the contents in the background art is not certain to fall within the prior art of the present application, but is only used for helping the understanding of the inventive conception and technical solutions of the present application. The background art should not be used for evaluating the novelty and creativity of the present application in the case that there is no tangible evidence to suggest that the above-mentioned contents have been disclosed on the application date of the present application.

SUMMARY OF THE INVENTION

The present application provides a power-supplying and driving circuit of an active equalization matrix switch of a battery management system of a vehicle, so that mistaken turn-on may be effectively avoided.

In a first aspect, the present application provides a power-supplying and driving circuit of an active equalization matrix switch of a battery management system. The power-supplying and driving circuit includes a boost circuit, a constant current source circuit and a driver, where the boost circuit includes a first input end and a first output end; the constant current source circuit includes a constant current driving signal output end; the first input end of the boost circuit is connected to the positive pole of a battery pack of a matrix switch circuit; the first output end of the boost circuit is connected to the constant current source circuit so as to provide high potential for the constant current source circuit to drive the matrix switch circuit; the constant current driving signal output end of the constant current source circuit is connected to the matrix switch circuit so as to drive the matrix switch circuit; and the driver is used for controlling the constant current source circuit to output a constant current driving signal.

In some preferred embodiments, the constant current source circuit includes a driving switch tube; the driving switch tube is connected to the constant current driving signal output end; and the driver is used for controlling the driving switch tube to be turned on or off.

In some preferred embodiments, the boost circuit is a multi-stage charge pump circuit.

In some preferred embodiments, the constant current source circuit includes a current-limiting resistor, a voltage-stabilizing tube and a main constant current circuit; one end of the current-limiting resistor is connected to the first output end of the boost circuit, and the other end of the current-limiting resistor and one end of the voltage-stabilizing tube are co-connected to an input end of the main constant current circuit; and the other end of the voltage-stabilizing tube is grounded.

In some preferred embodiments, the main constant current circuit includes a first transistor, a second transistor, a third transistor, a fourth transistor and an adjusting resistor; a base of the first transistor is connected to a base of the second transistor, and a first pole of the first transistor and a first pole of the second transistor are co-connected to the input end of the main constant current circuit; a second pole of the second transistor is connected to a first pole of the third transistor; a base of the third transistor and a second pole of the first transistor are co-connected to one end of the adjusting resistor; and the other end of the adjusting resistor is grounded; a second pole of the third transistor is connected to a second pole of the fourth transistor; and a base of the fourth transistor is connected to the driver, and a first pole of the fourth transistor is connected to the constant current driving signal output end.

In some preferred embodiments, each of the first transistor, the second transistor and the third transistor is a PNP-type transistor; the fourth transistor is an NPN-type transistor; the first pole is an emitter; and the second pole is a collector.

In some preferred embodiments, the multi-stage charge pump circuit is a charge pump cascade circuit.

In some preferred embodiments, the multi-stage charge pump circuit is a two-stage charge pump circuit; the two-stage charge pump circuit includes a first diode, a second diode, a third diode, a fourth diode, a first capacitor, a second capacitor, a third capacitor, a fourth capacitor, a first switch, a second switch, a third switch and a fourth switch; the positive pole of the first diode is connected to the positive pole of the battery pack, the first diode, the second diode, the third diode and the fourth diode are successively connected in series, and the negative pole of the fourth diode is connected to the input end of the constant current source circuit; one end of the first capacitor is connected between the first diode and the second diode, and the other end of the first capacitor is grounded via the second switch; one end of the second capacitor is connected between the second diode and the third diode, and the other end of the second capacitor is grounded; one end of the third capacitor is connected between the third diode and the fourth diode, and the other end of the third capacitor is grounded via the fourth switch; one end of the first switch is connected to the positive pole of the battery pack, and the other end of the first switch is grounded via the second switch; one end of the third switch is connected between the second diode and the third diode, and the other end of the third switch is grounded via the fourth switch; and one end of the fourth capacitor is connected to the negative pole of the fourth diode, and the other end of the fourth capacitor is grounded.

In a second aspect, the present application provides a battery management system including a matrix switch circuit and the above-mentioned power-supplying and driving circuit.

In a third aspect, the present application provides a vehicle including the above-mentioned power-supplying and driving circuit.

Compared with the prior art, the present application has the beneficial effects that: by taking the boost circuit as a power supply, high potential is provided for driving switch tubes of the matrix switch circuit, and no transformers are used, so that EMI may be reduced. The constant current source circuit provides a constant driving current for driving the switch tube gated in the matrix switch circuit. In this way, by controlling the boost circuit or the constant current source circuit to be turned on or off, the matrix switch circuit may be indirectly controlled to work. The switch tubes of the matrix switch circuit are directly controlled by the constant current source circuit on the rear end, so that interference to the switch tubes may be minimized, and mistaken turn-on may be effectively avoided.

These and other objectives of the present invention will no doubt become obvious to those of ordinary skill in the art after reading the following detailed description of the preferred embodiment that is illustrated in the various figures and drawings.

DETAILED DESCRIPTION

In order to make technical problems, technical solutions and beneficial effects of the embodiments of the present application clearer and more understandable, the present application will be further described in detail below in conjunction with FIG. 1 to FIG. 4 and the embodiments. It should be understood that the specific embodiments described herein are merely intended to explain the present application, rather than to limit the present application.

Terms "first" and "second" are for descriptive purposes only, and cannot be understood as indicating or implying the relative importance or implicitly indicating the number of indicated technical features. Therefore, the features defined as "first" and "second" may explicitly or implicitly include one or more of the features. In the descriptions of the embodiments of the present application, the meaning of "a plurality of" may be two or more, unless it may be specifically defined otherwise.

First Embodiment

Figure 1:
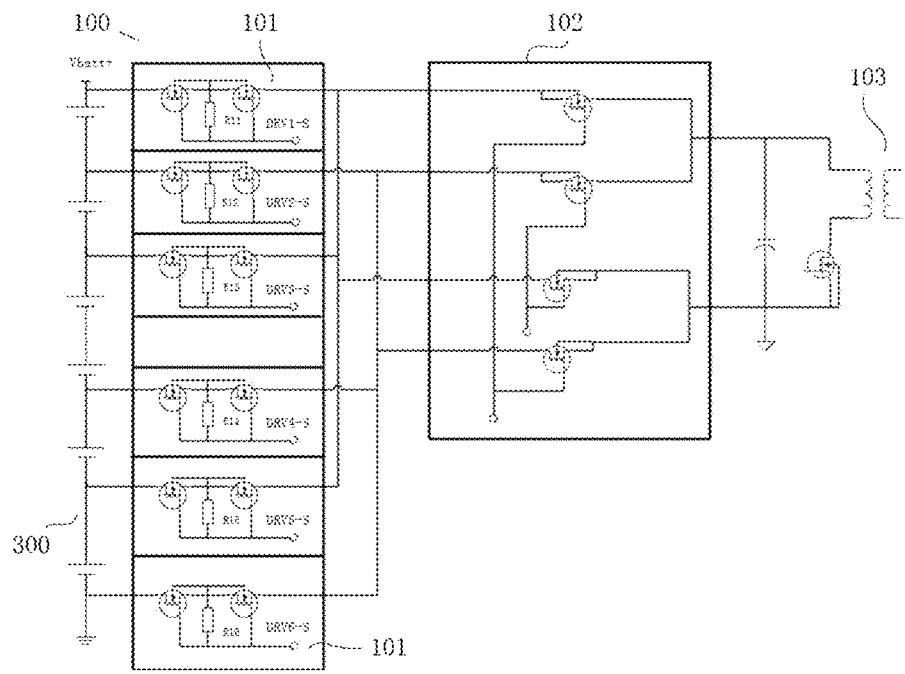
FIG. 1 shows a structure of a matrix switch circuit in a first embodiment of the present application.
Figure 2:
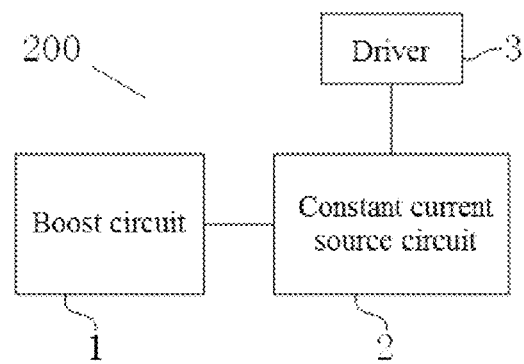
FIG. 2 shows a structure of a power-supplying and driving circuit of an active equalization matrix switch of a battery management system in the first embodiment of the present application.

Referring to FIG. 1 and FIG. 2, the present embodiment provides a battery management system including a matrix switch circuit 100 and a power-supplying and driving circuit 200 of an active equalization matrix switch of a battery management system. According to an actual situation, a product form of the battery management system may be equipped with a battery pack 300 or not equipped with the battery pack 300.

The power-supplying and driving circuit 200 is used for driving the matrix switch circuit 100. Referring to FIG. 1, the matrix switch circuit 100 is used for controlling the battery pack 300. The battery pack 300 includes a plurality of single batteries connected in series. In the present embodiment, all the single batteries in the battery pack 300 are lithium batteries. The matrix switch circuit 100 is capable of enabling one or more of the batteries in the battery pack 300 to output energy.

Referring to FIG. 1, the matrix switch circuit 100 includes a plurality of matrix switch sub-circuits 101, a reversing switch circuit 102 and a transformer circuit 103. In the present embodiment, each of the matrix switch sub-circuits 101 includes two switch tubes which are connected together; and specifically, the switch tubes are MOS tubes. According to an actual situation, the power-supplying and driving circuit 200 is capable of enabling a designated number of matrix switch sub-circuits 101 to work.

Referring to FIG. 1, each of the matrix switch sub-circuits 101 is used for connecting the single batteries in the battery pack 300 to the reversing switch circuit 102. One end of each of the matrix switch sub-circuits 101 is connected to the corresponding single battery. The other end of each of the matrix switch sub-circuits 101 is connected to the reversing switch circuit 102. The reversing switch circuit 102 is connected to the transformer circuit 103. In this way, the designated number of single batteries which are connected in series in the battery pack 300 may be controlled to output energy.

Referring to FIG. 2, the power-supplying and driving circuit 200 of the active equalization matrix switch of the battery management system in the present embodiment includes a boost circuit 1, a constant current source circuit 2 and a driver 3. The boost circuit 1 is used for boosting an input voltage to obtain a higher voltage; and the boost circuit 1 may be a multi-stage charge pump circuit. The constant current source circuit 2 is used for generating a constant current driving signal DRV1-S. The driver 3 is capable of controlling the constant current source circuit 2 to output the constant current driving signal DRV1-S via a control signal DRV1.

Figure 3:
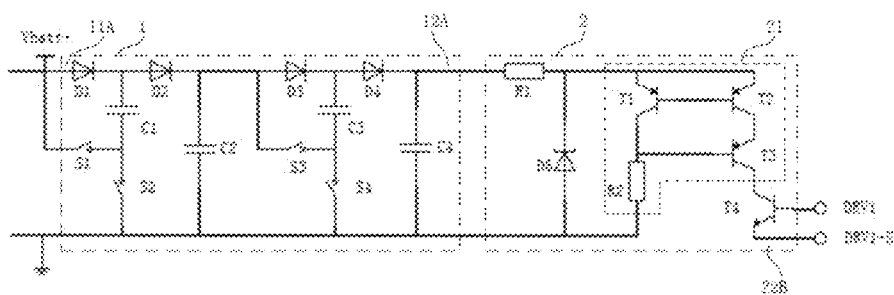
FIG. 3 shows a structure of a variant of the power-supplying and driving circuit of the active equalization matrix switch of the battery management system in the first embodiment of the present application.

Referring to FIG. 3, the boost circuit 1 includes a first input end 11A and a first output end 12A.

The constant current source circuit 2 includes a constant current driving signal output end 22B.

The first input end 11A of the boost circuit 1 is connected to the positive pole of the battery pack 300. The battery pack 300 includes a plurality of single batteries which are connected in series. The first input end 11A of the boost circuit 1 is connected to the positive pole of the battery pack 300, and thus, the boost circuit 1 may obtain the highest voltage.

The first output end 12A of the boost circuit 1 is connected to the constant current source circuit 2. In this way, the boost circuit 1 is capable of supplying power to the constant current source circuit 2 after working, thereby providing high potential for the constant current source circuit 2 to drive the matrix switch circuit 100.

The constant current driving signal output end 22B of the constant current source circuit 2 is connected to the matrix switch circuit 2 so as to drive the matrix switch circuit 100.

The driver 3 is used for controlling the constant current source circuit 2 to output the constant current driving signal DRV1-S. The constant current driving signal DRV1-S is input to the matrix switch sub-circuits 101, thereby enabling the switch tubes in the matrix switch sub-circuits 101 to work, and then enabling the designated number of batteries in the battery pack 300 to work.

In the present embodiment, the boost circuit 1 is connected to the battery pack 300 to supply power to the constant current source circuit 2. The driver 3 generates the control signal DRV1 input to the constant current source circuit 2, thereby enabling the constant current source circuit 2 to output the constant current driving signal DRV1-S to the matrix switch circuit 100. The boost circuit 1 is connected to the positive pole of the battery pack 300, and the voltage output by the boost circuit 1 is higher than the voltage of the battery pack 300, so that the potential of the constant current driving signal DRV1-S is higher than the potential of the positive pole of the battery pack 300. In this way, the power-supplying and driving circuit 200 is capable of driving any one of the matrix switch sub-circuits 101 in the matrix switch circuit 100, thereby enabling the designated number of batteries which are connected in series to work. A plurality of sub constant current driving signals may be generated based on the constant current driving signal DRV1-S to drive one of the matrix switch sub-circuits, thereby enabling the designated number of batteries which are connected in series to work. Specifically, sub constant current driving signals DRV2-S, DRV3-S, DRV4-S, DRV5-S and DRV6-S are generated based on the constant current driving signal DRV1-S to drive the six matrix switch sub-circuits 101.

It can be known from the above that by taking the boost circuit 1, such as a charge pump, as a power supply, high potential is provided for driving the switch tubes of the matrix switch circuit 100, and no transformers are used, so that EMI may be reduced. The constant current source circuit 2 provides a constant driving current for driving the switch tube gated in the matrix switch circuit 100. In this way, by controlling the boost circuit 1 or the constant current source circuit 2 to be turned on or off, the matrix switch circuit 100 can be indirectly controlled to work. The switch tubes of the matrix switch circuit 100 are directly controlled by the constant current source circuit 2 on the rear end, so that interference to the switch tubes may be minimized, and mistaken turn-on may be effectively avoided. The circuit in the present embodiment is simple and practical, high in cost performance and capable of reducing the production cost and improving the product stability.

Referring to FIG. 3, the constant current source circuit 2 in the present embodiment includes a driving switch tube T4. The driving switch tube T4 may be specifically a transistor or an MOS tube. The driving switch tube T4 is connected to the constant current driving signal output end 22B. The driver 3 is connected to the driving switch tube T4 and is used for controlling the driving switch tube T4 to be turned on or off. When the driver 3 inputs the control signal DRV1 to a base of the driving switch tube T4, the driving switch tube T4 is turned on, and thus, the constant current driving signal DRV1-S may be output from the constant current driving signal output end 22B. The control signal of the driving switch tube T4 such as the MOS tube is simple, it is possible that a primary side driving signal of a transformer is not adopted, and thus, there are no technical problems such as electric isolation.

Referring to FIG. 3, the constant current source circuit 2 in the present embodiment further includes a current-limiting resistor R1, a voltage-stabilizing tube D5 and a main constant current circuit 21. One end of the current-limiting resistor R1 is connected to the first output end 12A of the boost circuit 1, and the other end of the current-limiting resistor R1 and one end of the voltage-stabilizing tube D5 are co-connected to an input end of the main constant current circuit 21. The other end of the voltage-stabilizing tube D5 is grounded. The main constant current circuit 21 is capable of generating a constant current signal. The current-limiting resistor R1 and the voltage-stabilizing tube D5 are capable of stabilizing an output voltage of the constant current source circuit 2 at a certain constant voltage value and outputting an output current as a constant current.

Referring to FIG. 3, the main constant current circuit 21 in the present embodiment includes a first transistor T1, a second transistor T2, a third transistor T3, a fourth transistor T4 and an adjusting resistor T2. The fourth transistor T4 is the driving switch tube T4.

In the present embodiment, each of the first transistor T1, the second transistor T2 and the third transistor T3 is a PNP-type transistor; the fourth transistor T4 is an NPN-type transistor; and in other embodiments, the types of the transistors may be selected according to specific situations. A base of the first transistor T1 is connected to a base of the second transistor T2. A first pole, that is an emitter, of the first transistor T1 and a first pole, that is an emitter, of the second transistor T2 are co-connected to the input end of the main constant current circuit 21. A second pole, that is, a collector, of the second transistor T2 is connected to a first pole, that is an emitter, of the third transistor T3. A base of the third transistor T3 and a collector of the first transistor T1 are co-connected to one end of the adjusting resistor R2. The other end of the adjusting resistor R2 is grounded. A second pole, that is, a collector, of the third transistor T3 is connected to a second pole, that is, a collector, of the fourth transistor T4. A base of the fourth transistor T4 is connected to the driver 3. An emitter of the fourth transistor T4 is connected to the constant current driving signal output end 22B. When the boost circuit 1 supplies power to the constant current source circuit 2, the control signal DRV1 of the driver 3 controls the fourth transistor T4 to be turned on, so that the constant current driving signal DRV1-S directly drives the switch tubes in the matrix switch circuit 100. The current of the constant current driving signal DRV1-S output by the constant current source circuit 2 is $IR_2$. The current $IR_2$ is adjusted to be matched with pull-down resistors (such as pull-down resistors R11, R12, R13, R14, R15 and R16) of the switch tubes such as MOS tubes in the matrix switch circuit 100, so that the amplitudes of the driving voltages of the MOS tubes may be stable and reliable. In the present embodiment, the constant current source circuit 2 adopts a constant current manner in which a constant voltage is enabled and then a constant current is enabled. In other embodiments, other controllable precision current sources may also be used to replace a constant voltage source.

Figure 4:
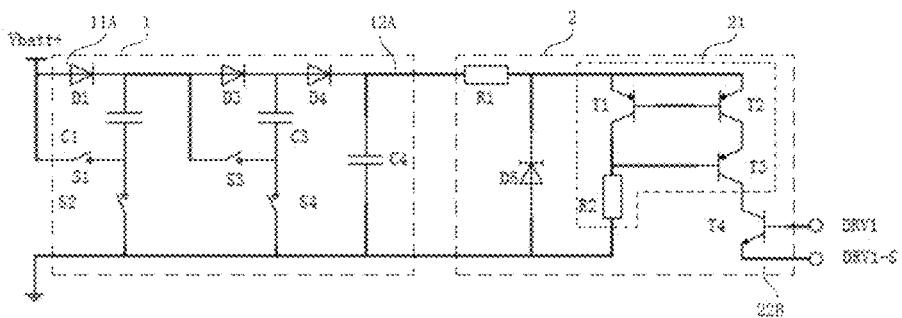
FIG. 4 shows a structure of another variant of the power-supplying and driving circuit of the active equalization matrix switch of the battery management system in the first embodiment of the present application.

Referring to FIG. 3 and FIG. 4, in the present embodiment, the multi-stage charge pump circuit serving as the boost circuit 1 may be a charge pump cascade circuit or two-stage charge pump circuit. The two-stage charge pump circuit is a two-stage integrated charge pump circuit and is simple in control logic. The control logic of the charge pump cascade circuit is substantially similar to that of the two-stage charge pump circuit.

The two-stage charge pump circuit is described. Referring to FIG. 3, the two-stage charge pump circuit includes a first diode D1, a second diode D2, a third diode D3, a fourth diode D4, a first capacitor C1, a second capacitor C2, a third capacitor C3, a fourth capacitor C4, a first switch S1, a second switch S2, a third switch S3 and a fourth switch S4.

The positive pole of the first diode D1 is connected to the positive pole of the battery pack 300. The first diode D1, the second diode D2, the third diode D3 and the fourth diode D4 are successively connected in series. The negative pole of the fourth diode D4 is connected to the input end of the constant current source circuit 2 and is connected to one end of the current-limiting resistor R1.

One end of the first capacitor C1 is connected between the first diode D1 and the second diode D2, and the other end of the first capacitor C1 is grounded via the second switch S2.

One end of the second capacitor C2 is connected between the second diode D2 and the third diode D3, and the other end of the second capacitor C2 is grounded.

One end of the third capacitor C3 is connected between the third diode D3 and the fourth diode D4, and the other end of the third capacitor C3 is grounded via the fourth switch S4.

One end of the first switch S1 is connected to the positive pole of the battery pack 300, and the other end of the first switch S1 is grounded via the second switch S2.

One end of the third switch S3 is connected between the second diode D2 and the third diode D3, and the other end of the third switch S3 is grounded via the fourth switch S4.

One end of the fourth capacitor C4 is connected to the negative pole of the fourth diode D4, and the other end of the fourth capacitor C4 is grounded.

The highest voltage of the battery pack 300 is Vbatt+. When the matrix switch circuit 100 is not required to work, all the switches (the first switch S1, the second switch S2, the third switch S3 and the fourth switch S4) are turned off, the fourth transistor T4 controlled by the control signal DRV1 of the driver 3 is not turned on, and therefore, the power consumption of the overall circuit is lowest. When a certain matrix switch sub-circuit 101 in the matrix switch circuit 100 is required to be turned on, the overall circuit starts to work:

step 1, the second switch S2 and the fourth switch S4 are turned on, and the first capacitor C1 and the third capacitor C3 are both charged to a voltage Vbatt+(the voltages of the second capacitor C2 and the fourth capacitor C4 are both Vbatt+ in a normal state);

step 2, the second switch S2 is turned off, and the first switch S1 is turned on; and the voltage of the first capacitor C1 may not be suddenly changed, the voltage on the upper end of the first capacitor C1 becomes 2Vbatt+, and therefore, the second capacitor C2, the third capacitor C3 and the fourth capacitor C4 are also charged to a voltage 2Vbatt+;

step 3, the fourth switch S4 is turned off, and the third switch S3 is turned on; and the voltage of the third capacitor C3 may not be suddenly changed, the voltage on the upper end of the third capacitor C3 becomes 4Vbatt+, and therefore, the fourth capacitor C4 is also charged to a voltage 4Vbatt+;

step 4, the first switch S1 and the third switch S3 are turned off, the second switch S2 is turned on, and the fourth switch S4 enables the first capacitor C1 and the third capacitor C3 to be recharged to perform the next switching period; and the step 1 to the step 4 are repeated so that an output voltage is stably output.

It can be known from above that in a non-working state, all the switches do not work, an input voltage is also lower, and therefore, the static power consumption of the circuit in the present embodiment is low. A two-stage voltage pump is adopted so as to be applied to a battery pack with fewer strings (at least one string). An output driving voltage is far higher than a driving voltage required by the switch tube of the highest string of matrix switch sub-circuit 101, so that it can be ensured that the switch tube is effectively turned on. Since no magnetic devices such as inductors are introduced to the present embodiment, there are almost no problems such as electromagnetic interference. By adjusting a stable value of the output voltage, different voltage platforms may be adapted. The device in the present embodiment is simple and low in cost.

Second Embodiment

The present embodiment provides a vehicle which is specifically an electric vehicle. The vehicle includes the above-mentioned power-supplying and driving circuit 200.

The above-mentioned contents are further detailed descriptions of the present application in conjunction with the specific/preferred embodiments, but cannot affirm that the specific implementations of the present application are only limited to these descriptions. The ordinary skill in the art to which the present application belongs may make several replacements or variants on these described embodiments without departing from the conception of the present application, and these replacement or variants should be regarded to fall within the protection scope of the present application.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power-supplying and driving circuit of an active equalization matrix switch of a battery management system, comprising a boost circuit, a constant current source circuit and a driver, wherein the boost circuit comprises a first input end and a first output end;

the constant current source circuit comprises a constant current driving signal output end;

the first input end of the boost circuit is connected to the positive pole of a battery pack of a matrix switch circuit;

the first output end of the boost circuit is connected to the constant current source circuit so as to provide high potential for the constant current source circuit to drive the matrix switch circuit;

the constant current driving signal output end of the constant current source circuit is connected to the matrix switch circuit so as to drive the matrix switch circuit; and the driver is used for controlling the constant current source circuit to output a constant current driving signal.

2. The power-supplying and driving circuit of claim 1, wherein the constant current source circuit comprises a driving switch tube; the driving switch tube is connected to the constant current driving signal output end; and the driver is used for controlling the driving switch tube to be turned on or off.

3. The power-supplying and driving circuit of claim 1, wherein the boost circuit is a multi-stage charge pump circuit.

4. The power-supplying and driving circuit of claim 1, wherein the constant current source circuit comprises a current-limiting resistor, a voltage-stabilizing tube and a main constant current circuit;

one end of the current-limiting resistor is connected to the first output end of the boost circuit, and the other end of the current-limiting resistor and one end of the voltage-stabilizing tube are co-connected to an input end of the main constant current circuit; and the other end of the voltage-stabilizing tube is grounded.

5. The power-supplying and driving circuit of claim 4, wherein the main constant current circuit comprises a first transistor, a second transistor, a third transistor, a fourth transistor and an adjusting resistor;

abase of the first transistor is connected to a base of the second transistor, and a first pole of the first transistor and a first pole of the second transistor are co-connected to the input end of the main constant current circuit;

a second pole of the second transistor is connected to a first pole of the third transistor;

a base of the third transistor and a second pole of the first transistor are co-connected to one end of the adjusting resistor; and the other end of the adjusting resistor is grounded;

a second pole of the third transistor is connected to a second pole of the fourth transistor; and a base of the fourth transistor is connected to the driver, and a first pole of the fourth transistor is connected to the constant current driving signal output end.

6. The power-supplying and driving circuit of claim 5, wherein each of the first transistor, the second transistor and the third transistor is a PNP-type transistor; the fourth transistor is an NPN-type transistor; the first pole is an emitter; and the second pole is a collector.

7. The power-supplying and driving circuit of claim 3, wherein the multi-stage charge pump circuit is a charge pump cascade circuit.

8. The power-supplying and driving circuit of claim 3, wherein the multi-stage charge pump circuit is a two-stage charge pump circuit;

the two-stage charge pump circuit comprises a first diode, a second diode, a third diode, a fourth diode, a first capacitor, a second capacitor, a third capacitor, a fourth capacitor, a first switch, a second switch, a third switch and a fourth switch;

the positive pole of the first diode is connected to the positive pole of the battery pack; the first diode, the second diode, the third diode and the fourth diode are successively connected in series, and the negative pole of the fourth diode is connected to the input end of the constant current source circuit;

one end of the first capacitor is connected between the first diode and the second diode, and the other end of the first capacitor is grounded via the second switch;

one end of the second capacitor is connected between the second diode and the third diode, and the other end of the second capacitor is grounded;

one end of the third capacitor is connected between the third diode and the fourth diode, and the other end of the third capacitor is grounded via the fourth switch;

one end of the first switch is connected to the positive pole of the battery pack, and the other end of the first switch is grounded via the second switch;

one end of the third switch is connected between the second diode and the third diode, and the other end of the third switch is grounded via the fourth switch; and one end of the fourth capacitor is connected to the negative pole of the fourth diode, and the other end of the fourth capacitor is grounded.

9. A battery management system, comprising a matrix switch circuit and the power-supplying and driving circuit of claim 1.

10. A vehicle, comprising the power-supplying and driving circuit of claim 1.

* * * * *